(12) United States Patent
Bromberg

(10) Patent No.: US 8,725,873 B1
(45) Date of Patent: May 13, 2014

(54) MULTI-SERVER ROUND ROBIN ARBITER

(75) Inventor: Dror Bromberg, Michmoret (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 192 days.

(21) Appl. No.: 13/206,992

(22) Filed: Aug. 10, 2011

Related U.S. Application Data

(60) Provisional application No. 61/372,381, filed on Aug. 10, 2010.

(51) Int. Cl.
*G06F 15/173* (2006.01)

(52) U.S. Cl.
USPC .............................. 709/225; 709/253; 710/56

(58) Field of Classification Search
USPC ....................................................... 709/225
See application file for complete search history.

(56) References Cited

U.S. PATENT DOCUMENTS

| | | | | |
|---|---|---|---|---|
| 5,774,668 A | * | 6/1998 | Choquier et al. | ............. 709/223 |
| 5,951,694 A | * | 9/1999 | Choquier et al. | ............... 714/15 |
| 7,443,790 B2 | * | 10/2008 | Aicklen et al. | ................ 370/228 |
| 2002/0176431 A1 | * | 11/2002 | Golla et al. | .................... 370/412 |
| 2010/0046537 A1 | * | 2/2010 | Perlmutter et al. | ........... 370/419 |
| 2011/0026541 A1 | * | 2/2011 | Beshai | .......................... 370/422 |

OTHER PUBLICATIONS

Automated Generation of Round-Rogin Arbitration and Crossbar Switch Logic Author: Eung S. Shin School of Electrical and Computer Enginnering, Georgia Institute of Tehcnology Nov. 2003.*
"Crossbar switch," Wikipedia, http://en.wikipedia.org/wiki/crossbar_switch, last modified Aug. 10, 2011, 6 pages.
"Wavefront arbiter," Wikipedia, http://en.wikipedia.org/wiki/Wavefront_arbiter, last modified Mar. 15, 2010, 2 pages.

* cited by examiner

*Primary Examiner* — Tauqir Hussain

(57) ABSTRACT

A plurality of server access requests is received from a plurality of clients via at least one input port of an arbiter. One or more of a plurality of servers that are available for access by the plurality of clients are identified. One or more of the plurality of clients are selected based on identifying the one or more available servers and based on a selection sequence that includes each of the plurality of clients from which one of the plurality of server access requests has been received. Data indicative of a requested service is forwarded from each of the one or more selected clients to a corresponding one of the one or more available servers.

21 Claims, 9 Drawing Sheets

MULTI-SERVER ROUND ROBIN ARBITER

CROSS-REFERENCE TO RELATED APPLICATION

The present application claims the benefit of U.S. Provisional Patent Application No. 61/372,381, entitled "MULTI-SERVER ROUND ROBIN ARBITER," filed on Aug. 10, 2010, which is hereby incorporated by reference herein in its entirety.

FIELD OF TECHNOLOGY

The present disclosure relates generally to computing systems and, more particularly, to an arbiter for managing shared access to resources in a computing system.

DESCRIPTION OF THE RELATED ART

The background description provided herein is for the purpose of generally presenting the context of the disclosure. Work of the presently named inventor, to the extent it may be described in this background section, as well as aspects of the description that may not otherwise qualify as prior art at the time of filing, are neither expressly nor impliedly admitted as prior art against the present disclosure.

In some computing systems, access to a system resource is shared by multiple devices. In some cases, an arbiter is used to determine which of the multiple devices may access the system resource at a particular time.

SUMMARY OF THE DISCLOSURE

In one embodiment, a method includes receiving, via at least one input port of an arbiter, a plurality of server access requests from a plurality of clients. The method also includes identifying one or more of a plurality of servers that are available for access by the plurality of clients. The method additionally includes selecting one or more of the plurality of clients based on identifying the one or more available servers and based on a selection sequence that includes each of the plurality of clients from which one of the plurality of server access requests has been received. The method further includes forwarding data indicative of a requested service from each of the one or more selected clients to a corresponding one of the one or more available servers.

In another embodiment, an arbiter includes at least one input port configured to receive a plurality of requests for server access from a plurality of clients. The arbiter also includes a plurality of selection logic blocks communicatively coupled to the at least one input port. The plurality of selection logic blocks is configured to identify one or more of a plurality of servers that are available for access by the plurality of clients. The plurality of selection logic blocks is also configured to select one or more of the plurality of clients based on identifying the one or more available servers and based on a selection sequence that includes each of the plurality of clients from which one of the plurality of requests for server access has been received. The plurality of selection logic blocks is further configured to generate one or more selection signals causing data indicative of a requested service to be forwarded from each of the one or more selected clients to a corresponding one of the one or more available servers.

In yet another embodiment, a network device configured to selectively transmit packets on a network includes a plurality of packet processing cores. The network device also includes a plurality of resources configured for shared access by the plurality of packet processing cores. The network devices further includes an arbiter configured to receive a plurality of requests for access to the plurality of resources from the plurality of packet processing cores. The arbiter is also configured to identify one or more of the plurality of resources that are available for access by the plurality of packet processing cores. The arbiter is additionally configured to select one or more of the plurality of packet processing cores based on identifying the one or more available resources and based on a selection sequence that includes each of the plurality of packet processing cores from which one of the plurality of requests has been received. The arbiter is further configured to generate one or more selection signals to cause data indicative of a requested service to be forwarded from each of the one or more selected packet processing cores to a corresponding one of the one or more available resources.

In still another embodiment, a method of operating a network device includes receiving a plurality of requests for access to a plurality of resources of the network device from a plurality of packet processing cores of the network device. The plurality of resources is configured for shared access by the plurality of packet processing cores. The method also includes identifying one or more of the plurality of resources that are available for access by the plurality of packet processing cores. The method additionally includes selecting one or more of the plurality of packet processing cores based on identifying the one or more available resources and based on a selection sequence that includes each of the plurality of packet processing cores from which one of the plurality of requests has been received. The method further includes forwarding data indicative of a requested service from each of the one or more selected packet processing cores to a corresponding one of the one or more available resources.

DETAILED DESCRIPTION

Figure 1A:
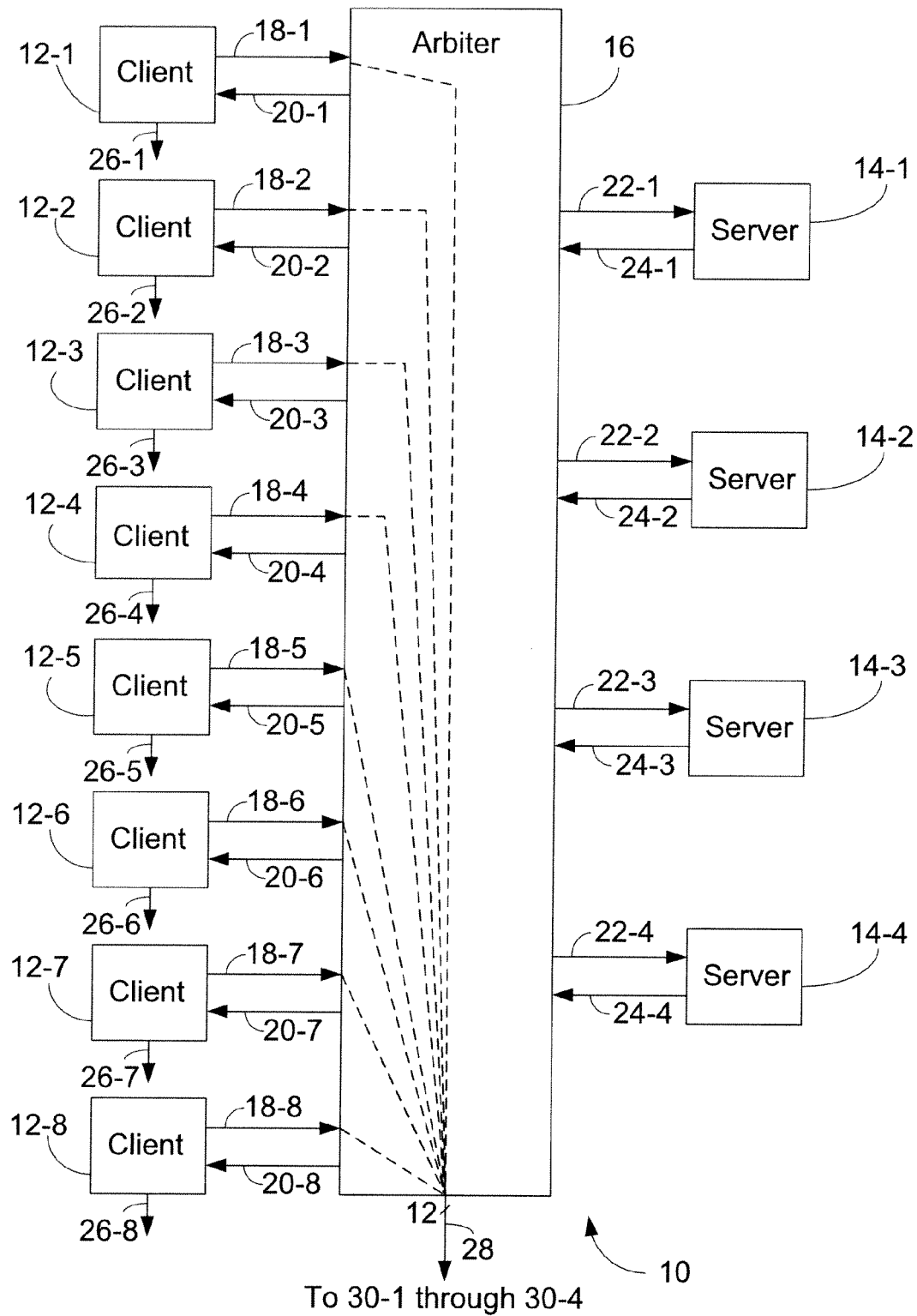
FIGS. 1A and 1B are partial block diagrams of an example system for managing server access of a plurality of clients, according to an embodiment.

FIG. 1A is a partial block diagram of an example system 10 for managing server access of a plurality of clients, according to an embodiment. In the example of FIG. 1A, the system 10 includes a plurality of clients 12, a plurality of servers 14, and an arbiter 16. While the example of FIG. 1A shows the system 10 as including eight clients 12-1 through 12-8 and four servers 14-1 through 14-4, it is noted that in various other embodiments, the system 10 includes any suitable numbers of clients 12 and servers 14. In some embodiments, the plurality of servers 14 is a plurality of resources to which the plurality of clients 12 share access. In some embodiments, the plurality of clients 12 includes any devices, components, elements, etc. for which access to resources (servers) is required or desired. According to various embodiments, the arbiter 16 manages access of the plurality of clients 12 to the plurality of servers 14. As discussed in greater detail below, the plurality of clients 12 comprises, in some examples, a plurality of processing units, and the plurality of servers 14 comprises, in some examples, a plurality of memory units or other suitable resources that are shared among a plurality of processing units, such as a plurality of counters. According to various embodiments, the plurality of servers 14 is implemented on a common integrated circuit (IC), such as an IC used in a network switching device configured to selectively transmit packets on a network. Thus, the plurality of servers 14 comprises, for example, a plurality of memories or a plurality of counters disposed on a single IC used in a network switching device (e.g., an Ethernet switch). In at least some embodiments, the plurality of clients 12 is implemented on the common IC as well. In some embodiments, the plurality of clients 12 comprises, for example, a plurality of packet processing cores of a network switching device. An example of a network switching device having a plurality of processing cores is disclosed in U.S. patent application Ser. No. 12/706,704, entitled "SWITCH DEVICE HAVING A PLURALITY OF PROCESSING CORES," filed on Feb. 16, 2010, the entire disclosure of which is hereby incorporated by reference herein.

In still further embodiments, the plurality of clients 12 comprises any other suitable components for which shared access to a plurality of resources is required or desired. For example, in some embodiments, the plurality of clients 12 comprises components of a device other than a network switching device. In one such example, the plurality of clients 12 comprises a plurality of cores of a multi-core processor implemented as part of a general purpose computing device, and the plurality of servers 14 comprises a plurality of memory units of the general purpose computing device that are shared by the plurality of processor cores. Additional example implementations of the plurality of clients 12 and the plurality of servers 14 are described in further detail below. It is also noted that in some embodiments, the plurality of clients 12 includes one or more clients for which access to the plurality of servers 14 is not required or desired at one or more particular times. In these embodiments, at such one or more particular times, the arbiter 16 manages shared access of the remaining ones of the plurality of clients 12 to the plurality of servers 14, as further described below.

The arbiter 16 is communicatively coupled to each of the plurality of clients 12 and to each of the plurality of servers 14, according to an embodiment. For example, each of the plurality of clients 12 is configured to send a corresponding client request signal 18 to the arbiter 16, in an embodiment. For example, as shown in FIG. 1A, a client 12-1 is configured to send a corresponding client request signal 18-1 to the arbiter 16, a client 12-2 is configured to send a corresponding client request signal 18-2 to the arbiter 16, etc. In an embodiment, the arbiter 16 is also configured to send a corresponding arbiter acknowledge signal 20 to each of the plurality of clients 12. For example, as shown in FIG. 1A, the arbiter 16 is configured to send a corresponding arbiter acknowledge signal 20-1 to the client 12-1, and is configured to send a corresponding arbiter acknowledge signal 20-2 to the client 12-2, and so on.

As noted above, the plurality of clients 12 in some cases includes one or more clients that are not requesting access to the plurality of servers 14 at a particular time. At such a particular time, the one or more of the plurality of clients 12 that are not requesting access to the plurality of servers 14 do not send corresponding client request signals 18 to the arbiter 16. For example, if the client 12-1 and the client 12-6 are not requesting access to the plurality of servers 14 at a particular time, then at the particular time the client request signals 18-1 and 18-6 are not sent to the arbiter 16.

According to an embodiment, the arbiter 16 is configured to send a corresponding arbiter request signal 22 to each of the plurality of servers 14. For example, as shown in FIG. 1A, the arbiter 16 is configured to send a corresponding arbiter request signal 22-1 to a server 14-1, and is configured to send a corresponding arbiter request signal 22-2 to a server 14-2, and so on. In an embodiment, each of the plurality of servers 14 is also configured to send a corresponding server acknowledge signal 24 to the arbiter 16. For example, as shown in FIG. 1A, the server 14-1 is configured to send a corresponding server acknowledge signal 24-1 to the arbiter 16, the server 14-2 is configured to send a corresponding server acknowledge signal 24-2 to the arbiter 16, etc.

As further shown in FIG. 1A, each of the clients 12 outputs a corresponding one of a plurality of data signals 26 that represents a particular requested service of the client 12, according to an embodiment. For example, the client 12-1 outputs a data signal 26-1, the client 12-2 outputs a data signal 26-2, etc. However, in situations where one or more of the plurality of clients 12 does not request access to the plurality of servers 14, the one or more of the plurality of clients 12 do not output corresponding ones of the data signals 26, in some embodiments. As discussed below with respect to FIG. 1B, the data signals 26 are forwarded to the plurality of servers 14 under control of the arbiter 16 so that the plurality of servers 14 accommodates the requests of the clients 12 in a fair and/or efficient manner, according to various embodiments. In particular, according to an example, each of the servers 14 returns data to a corresponding client 12 that requested the data via a demultiplexer (not shown) in order to respond to the request of the client 12.

In some embodiments, the arbiter 16 generates a plurality of client select signals 28-1 through 28-4 on a client select output bus 28. The plurality of client select signals 28-1 through 28-4 indicates, for example, those ones of the clients 12 selected for access to each corresponding one of the plurality of servers 14-1 through 14-4. As represented by the dashed lines in FIG. 1A between each of the client request signals 18 and the client select output bus 28, those ones of the clients 12 that are selected for access to the servers 14 are selected by the arbiter 16 in response to the assertion of their corresponding client request signals 18. In some embodiments, as further described below, the arbiter 16 makes such selections in order to implement shared access of the plurality of clients 12 to the plurality of servers 14 in a fair and/or efficient manner.

Figure 1B:
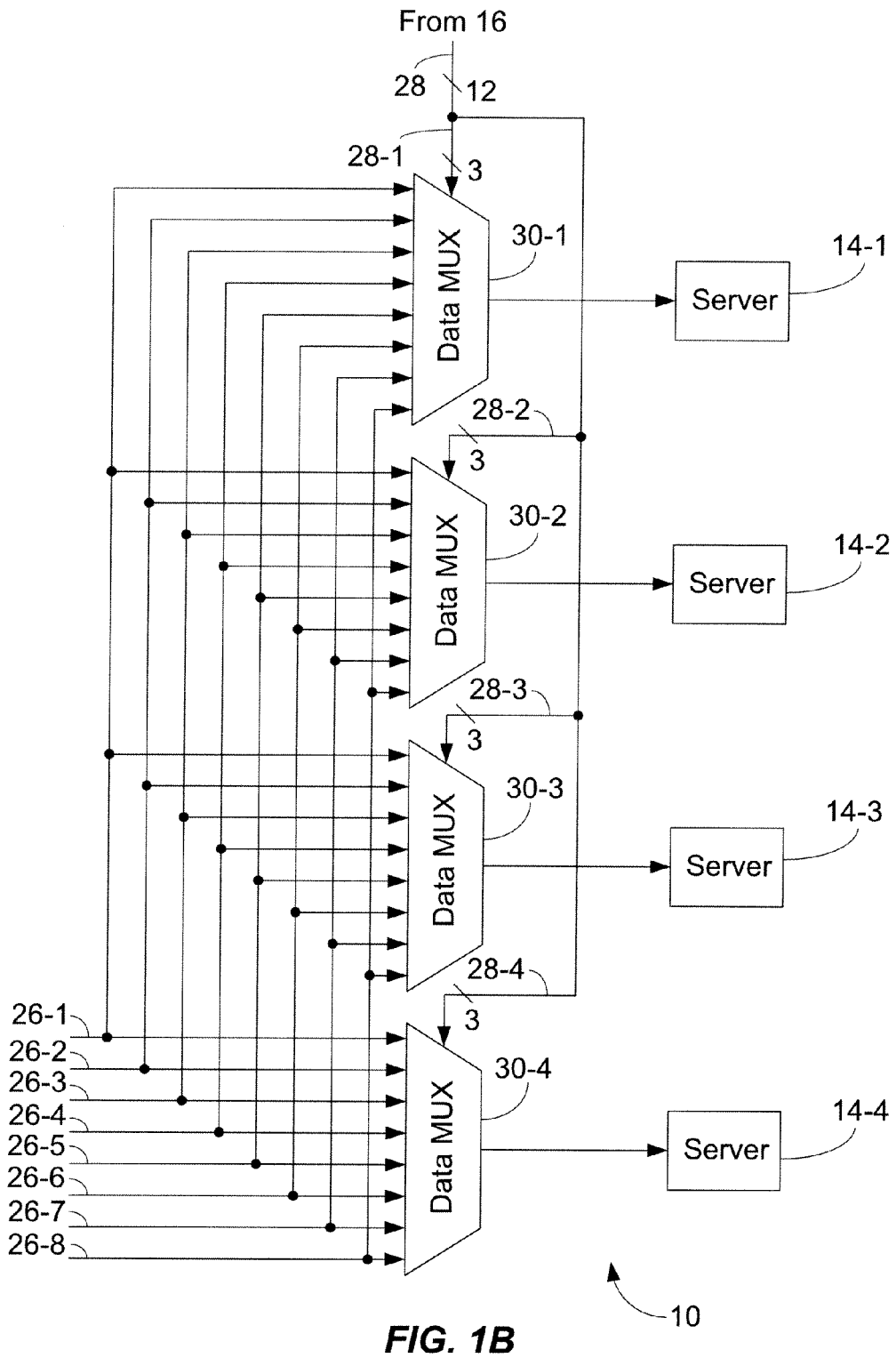

In at least some embodiments, the features of the example system 10 shown and described with respect to FIG. 1A are implemented in conjunction with the features of the example system 10 shown and described with respect to FIG. 1B. FIG. 1B is another partial block diagram of the example system 10, showing that each of the plurality of client select signals 28-1 through 28-4 is provided to a select input of a corresponding one of a plurality of data multiplexers (data MUXes) 30-1 through 30-4, according to an embodiment. In the example of FIG. 1B, each of the plurality of data MUXes 30 also receives the plurality of data signals 26 from the plurality of clients 12.

Each of the plurality of data MUXes 30 is also coupled to a corresponding one of the plurality of servers 14, according to an embodiment. In some embodiments, the client select signals 28-1 through 28-4 indicate the clients 12 selected for access to the corresponding servers 14-1 through 14-4. More particularly, the client select signals 28-1 through 28-4 indicate the clients 12 selected for access to the servers 14 during a particular clock cycle of the system 10, in some embodiments. The plurality of data MUXes 30 use the corresponding client select signals 28-1 through 28-4 from the arbiter 16 to select the appropriate data signal 26 from the appropriate one of the clients 12 to be forwarded to the corresponding server 14 in order to allow the corresponding server 14 to provide a particular requested service to the client 12 (e.g., where the corresponding server 14 is a memory, writing data provided by the client 12 to memory).

In some embodiments, the arbiter 16 implements "round robin" access of the plurality of clients 12 to the plurality of servers 14, where the plurality of clients 12 are served in turn according to a selection sequence. In some embodiments, the selection sequence includes the client 12-1, followed by the client 12-2, followed by a client 12-3, and so on until a last one of the plurality of clients, such as a client 12-8 as illustrated in FIG. 1A. In some embodiments, the selection sequence repeats itself once, more than once, or indefinitely, e.g., after the client 12-8, the next client in the selection sequence is the client 12-1, followed by the client 12-2, etc. Of course, the selection sequence proceeds in any suitable manner according to various embodiments, including embodiments where the selection sequence includes the clients 12-1, 12-2, 12-3, etc. in any other suitable order and embodiments where the plurality of clients 12 includes more than eight clients or less than eight clients.

In some cases where one or more of the plurality of clients do not request access to the plurality of servers 14, the arbiter 16 redefines the selection sequence accordingly. In one embodiment, the arbiter 16 defines the selection sequence based on the client request signals 18 that are received from the clients 12. Thus, in one example, the clients 12-1 and 12-6 do not request access to the plurality of servers 14 at a particular time. At the particular time, the arbiter 16 receives the client request signals 18-2, 18-3, 18-4, 18-5, 18-7, and 18-8, and consequently defines the selection sequence to include, for example, the client 12-2, followed by the client 12-3, the client 12-4, the client 12-5, the client 12-7, and the client 12-8.

In some embodiments, the arbiter 16 implements round robin access of the plurality of clients 12 to a subset of the plurality of servers 14. For example, the subset of the plurality of servers 14 includes one or more of the plurality of servers 14 that are available to respond to requests from the plurality of clients 12, as indicated by the server acknowledge signals 24 and further described below. In some cases, one or more of the plurality of servers 14 are not available because such servers are due to respond to (e.g., acknowledge) particular requests (e.g., as represented by the data signals 26) that were previously received from one or more of the plurality of clients 12 or from one or more other clients. That is, in some cases, one or more of the plurality of servers 14 take multiple clock cycles to respond to and/or acknowledge one or more requests from a corresponding one or more clients that have been selected for access to the one or more servers 14, and thus the one or more servers 14 are unavailable to receive, acknowledge, and/or respond to further requests from other clients for such multiple clock cycles. Accordingly, in some embodiments, while one or more of the plurality of servers 14 are unavailable, the arbiter 16 will implement round robin access to the remaining subset of the plurality of servers 14 for those ones of the plurality of clients 12 that are not awaiting a response to a particular request from one of the plurality of servers 14 after having previously been selected by the arbiter 16 for access to one of the plurality of servers 14. In some embodiments, one or more previously unavailable (e.g., unavailable in an earlier clock cycle) servers 14 will respond to a corresponding one or more outstanding requests (e.g., in a later clock cycle) from a corresponding one or more of the clients 12 that were previously selected for access to the one or more servers 14. For example, the one or more previously unavailable servers 14 will respond to requests represented by a corresponding one or more of the data signals 26 from the corresponding one or more of the clients 12. The one or more previously unavailable servers 14 will then be available for the arbiter 16 to utilize in implementing round robin access to the servers 14.

It is noted that the subset of the plurality of servers 14 includes all of the plurality of servers 14 when all of the plurality of servers 14 are available to respond to (e.g., receive, acknowledge, and/or respond to) requests for access from the clients 12 at the beginning of a particular clock cycle. Thus, a reference to the subset of the plurality of servers 14 herein includes the possibility of all of the plurality of servers 14. In any event, those ones of the clients 12 that are not awaiting a response to a particular request from one of the servers 14 (e.g., after having previously been selected for access to one of the servers 14) therefore continue to be served as long as at least one of the plurality of servers 14 is available to receive, acknowledge, and/or respond to requests from those ones of the clients 12.

Figure 2:
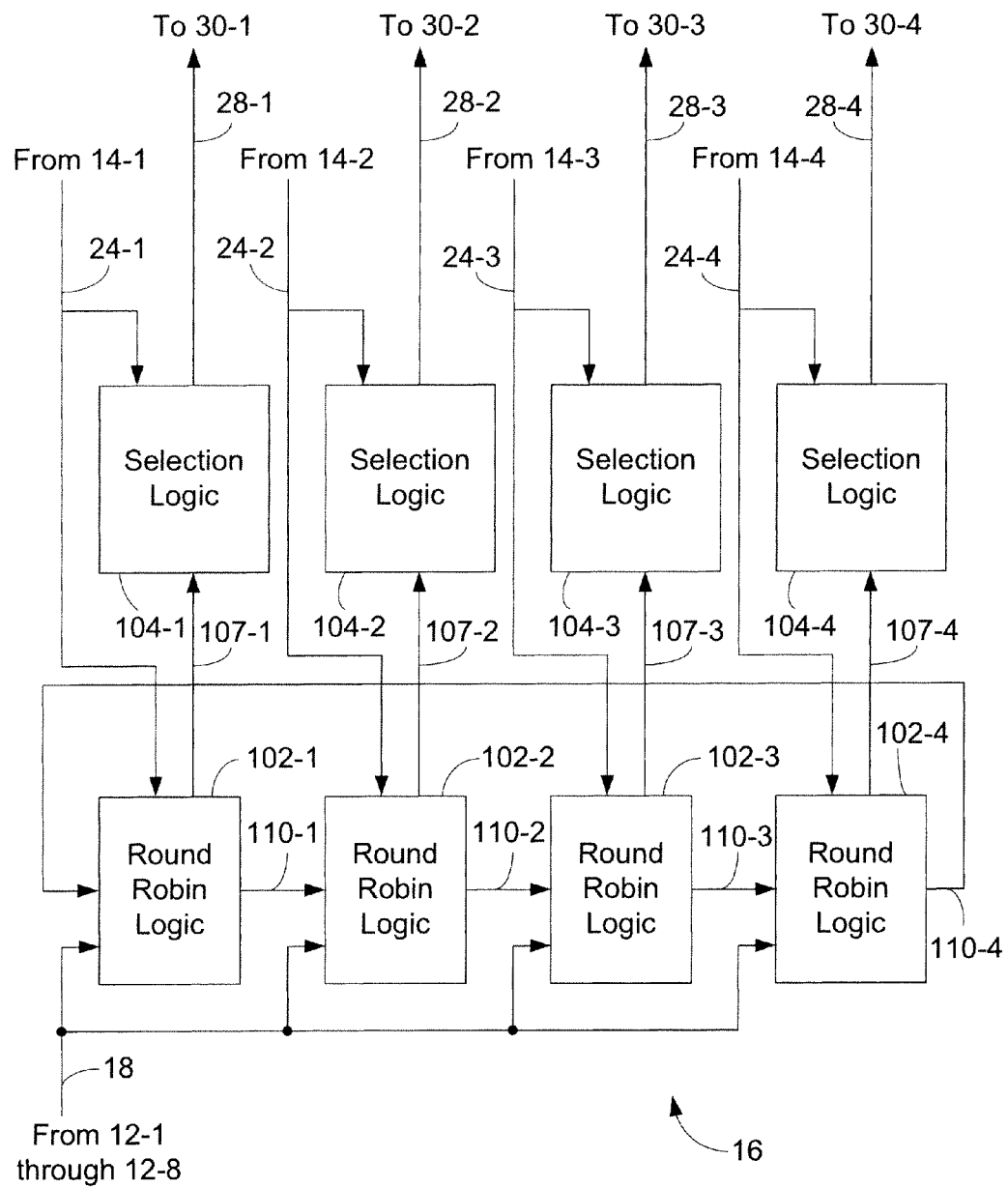
FIG. 2 is a block diagram of an arbiter, according to another embodiment.

FIG. 2 is a block diagram of the arbiter 16, according to an embodiment. In the example shown in FIG. 2, the arbiter 16 includes a plurality of round robin logic blocks 102 and a plurality of selection logic blocks 104. As shown in FIG. 2, the plurality of round robin logic blocks 102 includes four round robin logic blocks 102-1 through 102-4, and the plurality of selection logic blocks 104 includes four selection logic blocks 104-1 through 104-4, so that the arbiter 16 is configured to manage access of the plurality of clients 12 to four servers 14. The arbiter 16 is implemented in any suitable manner according to various embodiments, such as by including more than four or less than four round robin logic blocks 102 and/or selection logic blocks 104 in, for example, embodiments having more than four or less than four servers 14.

According to an embodiment, each of the plurality of round robin logic blocks 102 is communicatively coupled to an input bus that carries the client request signals 18 from each of the plurality of clients 12. For example, each of the plurality of clients 12 asserts a corresponding one of the client request signals 18 when the client 12 requires access to a resource, such as one of the plurality of servers 14. The input bus carries each of the client request signals 18 (e.g., client request signals 18-1 through 18-8) to the arbiter 16. The arbiter 16 then implements round robin shared access to the plurality of servers 14 for those clients 12 whose client request signals 18 are asserted.

The plurality of round robin logic blocks 102 is configured to identify a subset of the plurality of clients 12 for selection by the plurality of selection logic blocks 104 during each clock cycle. According to an embodiment, each of the plurality of selection logic blocks 104 generates a corresponding client select signal, such as a corresponding one of the client select signals 28-1 through 28-4. In one example, the client select signals are provided from the selection logic blocks 104 to the corresponding data MUXes 30, as further shown in FIG. 1B. In some embodiments, the arbiter 16 operates using a clock signal (not shown) generated within an integrated circuit (IC) on which the plurality of clients 12, the plurality of servers 14, and the arbiter 16 are disposed. In other embodiments, other suitable clock signals are used, including clock signals external to the IC, clock signals that are generated specifically for use by the arbiter 16, etc. In some embodiments, the plurality of round robin logic blocks 102 identifies the subset of the plurality of clients 12 according to a selection sequence, as generally discussed above and further discussed in detail below.

In some embodiments, the plurality of round robin logic blocks 102 identifies the subset of the plurality of clients 12 further based on whether one or more of the plurality of clients 12 were previously selected for access to one or more corresponding servers 14 but are still waiting for the one or more corresponding servers 14 to respond to particular requests (e.g., as represented by corresponding ones of the data signals 26) of the one or more clients 12. For example, where one of the plurality of clients 12 was selected for access to one of the servers 14 by a corresponding one of the plurality of selection logic blocks 104 in a previous clock cycle, but is still awaiting a response from the one server 14 to the corresponding data signal 26 at the beginning of a current clock cycle, the three round robin logic blocks 102 corresponding to the remaining three selection logic blocks 104 identify three new ones of the plurality of clients 12 for selection during the current clock cycle. Meanwhile, the round robin logic block 102 corresponding to the waiting client 12, in conjunction with a corresponding selection logic block 104, prevents further ones of the plurality of clients 12 from being selected for access to the one server 14 that is still due to serve the waiting client 12. According to various embodiments, the waiting client 12 continues to be selected for access to the one server 14 that is due to serve the waiting client 12 until the waiting client 12 is served, or a suitable maximum number of clock cycles has passed without the waiting client 12 being served. Of course, in still further embodiments, the waiting client 12 continues to be selected for access to the one server 14 for any suitable period of time and/or according to any suitable criteria.

According to an embodiment, each of the plurality of round robin logic blocks 102 that corresponds to an available one of the plurality of servers 14 generates a corresponding one of a plurality of round robin output signals 107 indicative of the client 12 identified by the round robin logic block 102 in a particular clock cycle. Each of the plurality of round robin output signals 107 is provided to a corresponding one of the plurality of selection logic blocks 104, in an example. Each of the plurality of selection logic blocks 104 selects a request from a corresponding one of the plurality of clients 12 to be asserted to a corresponding one of the plurality of servers 14, according to an embodiment.

In some embodiments, as further described below, each of the plurality of round robin logic blocks 102 that corresponds to an unavailable one of the plurality of servers 14 does not identify a new one of the clients 12 during the clock cycle(s) in which the corresponding server 14 is unavailable. For example, if the client 12 that a selection logic block 104 previously selected (e.g., during a previous clock cycle) for access to the corresponding server 14 is still waiting for the corresponding server 14 to respond to the particular request represented by the corresponding data signal 26, a corresponding one of the round robin logic blocks 102 does not identify a new one of the clients 12 to be selected for access to the corresponding server 14 (e.g., during a current clock cycle). The selection logic block 104 continues (e.g., during the current clock cycle) to select the previously selected client 12. On the other hand, if the previously selected client 12 has received a response to its data signal 26 (e.g., during a previous clock cycle), then the corresponding round robin logic block 102 identifies a new client 12 (e.g., during a current clock cycle) and the corresponding selection logic block 104 selects (e.g., during the current clock cycle) the client 12 that is newly identified by the corresponding round robin logic block 102, in some embodiments.

In some embodiments, in order to allow each of the selection logic blocks 104 to continue to select a previously selected client 12 that has not yet been served by a corresponding server 14, each of the selection logic blocks 104 receives a corresponding server acknowledge signal, such as a corresponding one of the server acknowledge signals 24, from a corresponding server 14. For example, each of the plurality of servers 14 asserts its corresponding server acknowledge signal 24 in order to acknowledge a request from one of the plurality of clients 12, in an embodiment. For example, the plurality of clients 12, the plurality of servers 14, and the arbiter 16 communicate using a request/parking-acknowledge protocol, in some embodiments. Once a corresponding server acknowledge signal 24 is asserted, the corresponding selection logic block 104 will identify the corresponding server 14 as available to respond to a new request, and will select a new one of the plurality of clients 12 for access to the corresponding server 14 in a next clock cycle, as further described below, in some embodiments.

In some embodiments, as shown in FIG. 2, the server acknowledge signals 24 are also provided to the corresponding round robin logic blocks 102. In this manner, and as further described below, each of the round robin logic blocks 102 avoids identifying a new one of the clients 12 for access to the corresponding server 14 when a previously selected client 12 is still waiting for a response from the corresponding server 14. Additionally, each of the round robin logic blocks 102 provides a corresponding client identification signal 110 to a next one of the round robin logic blocks 102, in some embodiments. Each client identification signal 110 indicates, for example, those ones of the clients 12 identified by other round robin logic blocks 102 in a current and/or previous clock cycle, so that the round robin logic block 102 to which the client identification signal 110 is provided will not redundantly identify the same client 12, in an embodiment.

In some embodiments, during the same clock cycle in which one or more previously selected clients 12 continue to be selected for access to one or more corresponding servers 14, the plurality of selection logic blocks 104 also selects one or more new clients 12 (e.g., clients not selected during a previous clock cycle) for access to one or more other ones of the plurality of servers 14. Thus, according to various embodiments, the arbiter 16 implements round robin access of the plurality of clients 12 to the plurality of servers 14 while allowing server access for one or more of the clients 12 over multiple clock cycles when necessary.

Figure 3:
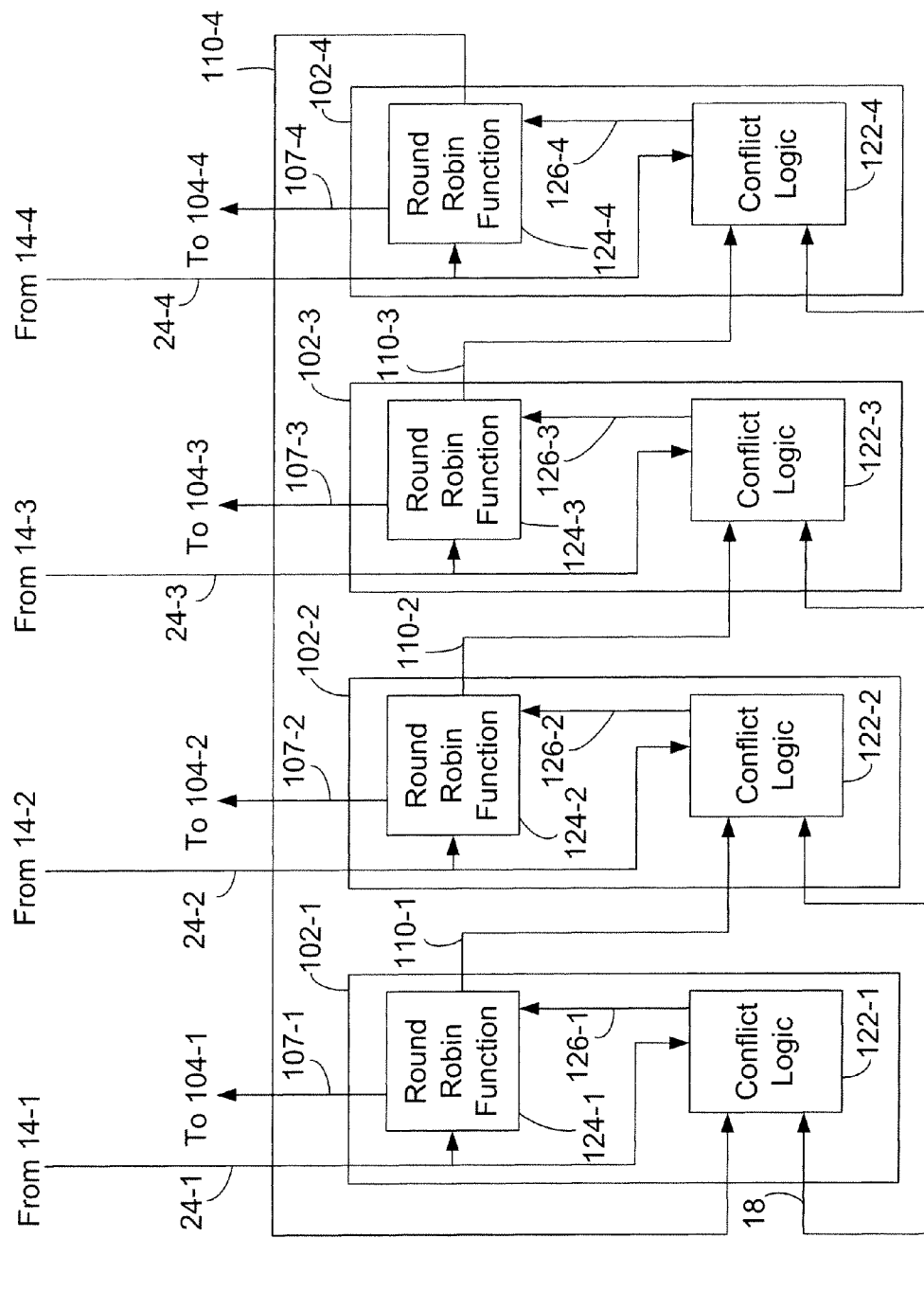
FIG. 3 is a block diagram of an implementation of a plurality of round robin logic blocks, according to yet another embodiment.

FIG. 3 is a block diagram of an implementation of the plurality of round robin logic blocks 102, according to an embodiment. As shown in FIG. 3, each of the plurality of round robin logic blocks 102 includes a conflict logic block 122 and a round robin function block 124. In an embodiment, each of the round robin function blocks 124 corresponds to one of the conflict logic blocks 122 and to one of the plurality of servers 14. In the example shown in FIG. 3, each of the round robin function blocks 124 is coupled to a corresponding one of the selection logic blocks 104, to the corresponding conflict logic block 122, and to another one of the conflict logic blocks 122. For example, FIG. 3 shows the client identification signal 110 from each round robin function block

124 being provided to an input of a conflict logic block 122 that corresponds to a different one of the plurality of servers 14. Thus, for example, the client identification signal 110-1 from a first one of the round robin function blocks 124-1 is provided to an input of a second one of the conflict logic blocks 122-2, and so on.

In some embodiments, the plurality of round robin function blocks 124 is configured to identify a subset of the plurality of clients 12 in each clock cycle such that the order in which the respective round robin function blocks 124 identify the clients 12 conforms to the selection sequence. In some embodiments, the plurality of round robin function blocks 124 is also or alternatively configured to identify a subset of clients 12 in each clock cycle such that the order in which the round robin function blocks 124 identify the clients 12 conforms to the selection sequence when considered relative to the order in which the round robin function blocks 124 identified a previous subset of the plurality of clients 12 during a previous clock cycle. As one example, when the system 10 has eight clients 12-1 through 12-8 and four servers 14-1 through 14-4, where all of the servers 14-1 through 14-4 are available to respond to requests during each clock cycle of the system 10, the round robin function blocks 124-1 through 124-4, respectively, identify the clients 12-1 through 12-4, respectively, for selection by the selection logic blocks 104-1 through 104-4, respectively, during a first clock cycle. During a second clock cycle, the round robin function blocks 124-1 through 124-4, respectively, identify the clients 12-5 through 12-8, respectively, for selection by the selection logic blocks 104-1 through 104-4, respectively, according to an example. Thus, in some embodiments, the selection of a subset of clients 12 for server access during the second clock cycle is based on both the selection sequence and on the selection of a subset of the clients 12 for server access during the first clock cycle.

In an embodiment, each of the conflict logic blocks 122 corresponds to one of the round robin function blocks 124 and to one of the plurality of servers 14. In the example shown in FIG. 3, each of the conflict logic blocks 122 is coupled to the input bus carrying the client request signals 18, to the corresponding server 14, to the corresponding selection logic block 104, to the corresponding round robin function block 124, and to another one of the round robin function blocks 124. For example, as described above, FIG. 3 shows an input of the second conflict logic block 122-2 coupled to an output of the first round robin function block 124-1. FIG. 3 also shows the input bus carrying the client request signals 18 coupled to each of the conflict logic blocks 122, and further shows the server acknowledge signals 24 being communicated to corresponding ones of the conflict logic blocks 122.

In some embodiments, each of the conflict logic blocks 122 is configured to mask one or more of the client request signals 18-1 through 18-8, so that the masked client request signals do not appear on a corresponding output bus 126 communicatively coupled to the corresponding round robin function block 124. More particularly, in some embodiments, each of the conflict logic blocks 122 is configured to mask any client request signal from a client 12 that has been identified, during the same clock cycle, by a round robin function block 124 corresponding to another one of the conflict logic blocks 122. In one example, the client identification signal 110-1 from the first round robin function block 124-1 causes the second conflict logic block 122-2 to mask a client request signal from the client 12-1 on the output bus 126-2, thus preventing a second round robin function block 124-2 from redundantly identifying the client 12-1 for selection when the client 12-1 was already identified by the first round robin function block 124-1 during the same clock cycle. According to an embodiment, the client identification signal 110-2 from the second round robin function block 124-2 is then provided to an input of a third conflict logic block 122-3 to cause the third conflict logic block 122-3 to prevent a third round robin function block 124-3 from redundantly identifying those ones of the plurality of clients 12 that were identified by the first and second round robin function blocks 124-1 and 124-2 during the same clock cycle, and so on. The configuration shown in FIG. 3 is by way of example and illustration, and not limitation. Accordingly, in various embodiments where one or more request signals are masked, such as in the manner described above, such masking is achieved in any suitable manner. As just one example, the input of each round robin function block 124 is coupled to the output of each preceding conflict logic block 122, in some embodiments.

In some embodiments, when a previously selected client 12 (e.g., a client selected for access to a corresponding server 14) is still waiting (e.g., during a current clock cycle) for a response from the corresponding server 14, the corresponding round robin function block 124 does not identify a new client 12 during the current clock cycle. More particularly, in some embodiments, the corresponding round robin function block 124 receives, via the corresponding output bus 126, the same input that was provided to a preceding one of the round robin function blocks 124 via the preceding output bus 126. In one embodiment, the corresponding server acknowledge signal 24 or a suitable signal from the corresponding selection logic block 104 is used to cause the input to the corresponding round robin function block 124 to be the same as the input that was provided to the preceding round robin function block 124. In this manner, the corresponding round robin function block 124 simply identifies the same one of the clients 12 that was identified by the preceding round robin function block 124, and this identification is effectively discarded by the corresponding client select logic block 132 as described below. Moreover, because the corresponding round robin function block 124 identifies the same client 12 that was identified by the preceding round robin function block 124, a subsequent one of the round robin function blocks 124 is able to identify a new one of the clients 12 such that the plurality of round robin function blocks 124, as a whole, identifies new clients 12 in a manner that conforms to the selection sequence.

In some embodiments, each of the conflict logic blocks 122 is also or alternatively configured to mask any request signal from a client 12 that was selected by one of the plurality of selection logic blocks 104 for access to a corresponding one of the servers 14 during a previous clock cycle but that is still waiting for the one server 14 to respond to a particular request represented by one of the data signals 26 corresponding to the previously selected client 12. In this manner, while the previously selected client 12 waits for the one server 14 to respond to its particular request, none of the round robin function blocks 124 redundantly identify the previously selected client 12.

Therefore, in an embodiment, and as shown in FIG. 3, each of the server acknowledge signals 24 is provided to a corresponding one of the conflict logic blocks 122 in order to indicate to the corresponding conflict logic block 122 whether a corresponding one of the plurality of servers 14 has responded to (e.g., acknowledged) a request from a corresponding previously selected one of the plurality of clients 12. In one embodiment, each of the conflict logic blocks 122 receives an indication of whether each other one of the plurality of servers 14 (e.g., those servers 14 corresponding to different conflict logic blocks 122) has acknowledged a corresponding request from another previously selected client 12 by way of an output of a preceding round robin function block 124, such as the preceding client identification signal 110. For example, an output of the round robin function block 124-1 is used to indicate to the conflict logic block 122-2 whether the servers 14-1, 14-3, and 14-4 have acknowledged corresponding requests from corresponding clients 12 that were selected for access to the servers 14-1, 14-3, and 14-4 in a previous clock cycle. Of course, according to various embodiments, each of the conflict logic blocks 122 receives one or more such indications from any suitable source. As just one example, all of the server acknowledge signals 24 are provided to each of the conflict logic blocks 122 in order to provide indications, to each of the conflict logic blocks 122, of whether each of the plurality of servers 14 has acknowledged a request from a previously selected client 12, in one embodiment.

In any event, each of the conflict logic blocks 122 masks one or more request signals on the corresponding output bus 126, such that any new clients 12 identified by the round robin function blocks 124 are identified in a round robin manner (e.g., according to a selection sequence) with respect to those ones of the plurality of clients 12 whose request signals are not masked by the conflict logic blocks 122, in some embodiments. For each clock cycle, each of the round robin function blocks 124 that identifies a new client 12 then generates a corresponding one of the round robin output signals 107 indicative of the new client 12 identified by the round robin function block 124, in some embodiments.

Figure 4:
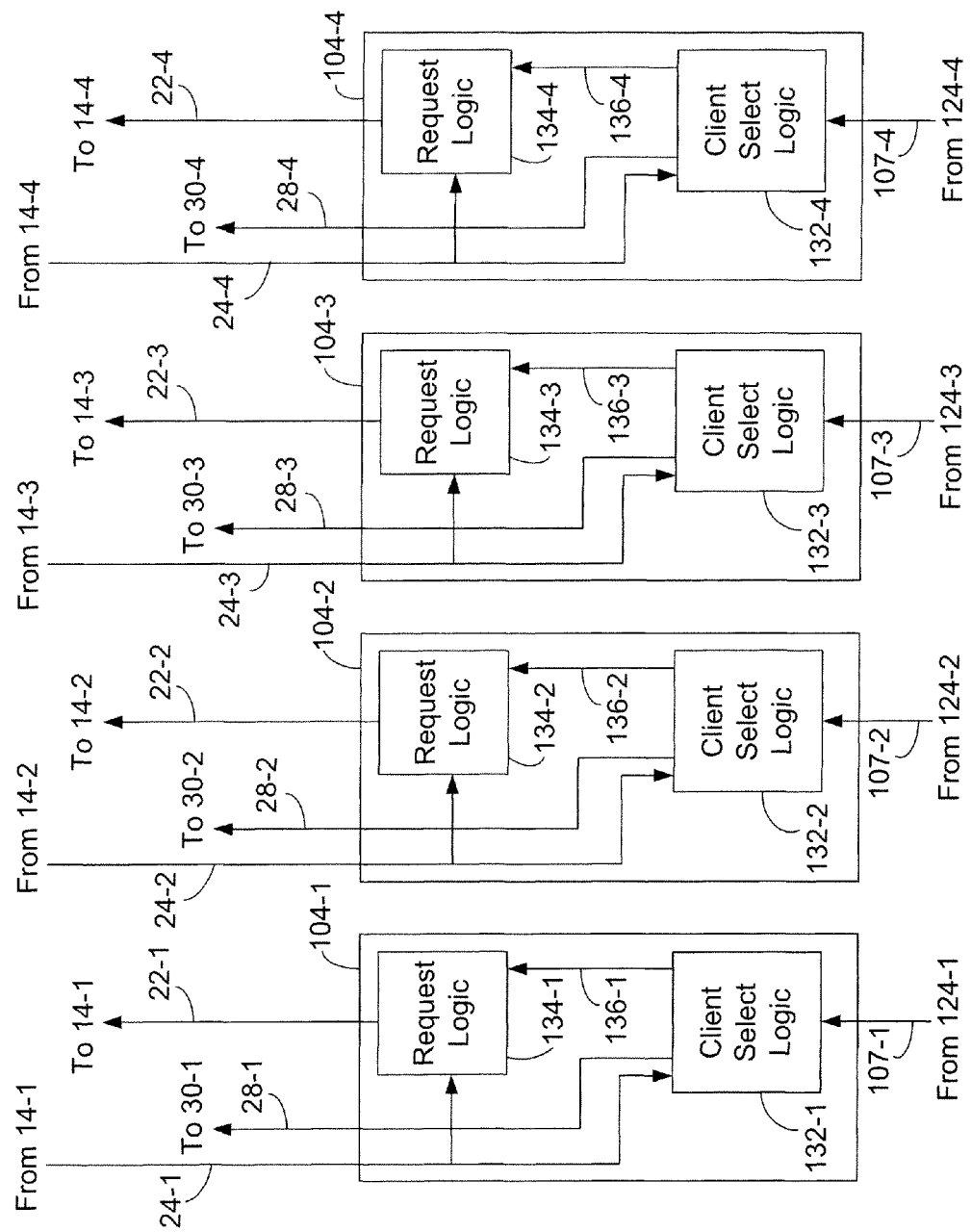
FIG. 4 is a block diagram of an implementation of a plurality of selection logic blocks, according to still another embodiment.

FIG. 4 is a block diagram of an example implementation of the plurality of selection logic blocks 104, according to an embodiment. As shown in FIG. 4, each of the plurality of selection logic blocks 104 includes a client select logic block 132 and a corresponding request logic block 134. Each of the plurality of selection logic blocks 104 corresponds to one of the plurality of servers 14, in an embodiment. In the example shown in FIG. 4, each of the client select logic blocks 132 is configured to receive one of the round robin output signals 107 from the round robin function block 124 corresponding to the same one of the plurality of servers 14 to which the client select logic block 132 corresponds.

According to an embodiment, each of the client select logic blocks 132 is configured to determine, for each clock cycle, whether a new one of the plurality of clients 12 is to be selected for access to the corresponding server 14, or whether the corresponding server 14 is to serve another one of the plurality of clients 12 that was selected by the client select logic block 132 for access to the corresponding server 14 in a previous clock cycle but is still waiting for the corresponding server 14 to respond to its particular request (e.g., a particular request represented by one of the data signals 26).

In one embodiment, each of the client select logic blocks 132 receives a corresponding one of the server acknowledge signals 24. In this manner, in some embodiments, during each clock cycle, each of the client select logic blocks 132 determines that a new one of the plurality of clients 12 is to be selected for access to the corresponding server 14 during the clock cycle when the corresponding server acknowledge signal 24 was asserted during the previous clock cycle. In other words, when a request from a previously selected client 12 (e.g., a client 12 selected by the client select logic block 132 for access to the corresponding server 14 during a previous clock cycle) has been acknowledged, as indicated by the previous state of the corresponding server acknowledge signal 24, the client select logic block 132 will determine that a new client 12 is to be selected for access to the corresponding server 14. According to an embodiment, the new client 12 is identified by the corresponding round robin function block 124 during the current clock cycle in the manner described above with respect to FIG. 3.

Conversely, in some embodiments, each of the client select logic blocks 132 determines that the corresponding server 14 is to serve a previously selected client 12, such as a client 12 that the client logic block 132 selected for server access in a previous clock cycle, if the corresponding server acknowledge signal 24 was not asserted during the previous clock cycle. In other words, if the corresponding server acknowledge signal 24 was not asserted during the previous clock cycle, the previously selected client 12 did not receive a response to (e.g., an acknowledgement of) its request from the corresponding server 14, and the previously selected client 12 should therefore be selected again for access to the corresponding server 14 in order to allow additional time for a response to the request.

In some embodiments, each of the client select logic blocks 132 also or alternatively determines, during each clock cycle, that a new one of the plurality of clients 12 is to be identified and selected for access to the corresponding server 14 during the clock cycle when the client select logic block 132 did not select any of the plurality of clients 12 for server access in the previous clock cycle. For example, if no client request signals 18 were asserted during the previous clock cycle, or if fewer client request signals 18 than the number of available servers 14 were asserted during the previous clock cycle, then one or more client select logic blocks 132 will not have selected any of the clients 12 for server access during the previous clock cycle. Thus, one or more corresponding round robin function blocks 124 will identify one or more new ones of the plurality of clients 12 and the one or more client select logic blocks 132 will select, in a current clock cycle, the one or more newly identified clients 12 for access to one or more corresponding ones of the servers 14, in some embodiments. Each client select logic block 132 operates in this manner by, for example, detecting whether a corresponding one of the arbiter request signals 22 generated by the corresponding request logic block 134 was de-asserted during the previous clock cycle. According to an embodiment, if the corresponding arbiter request signal 22 was de-asserted, the client select logic block 132 will know that no request was asserted to the corresponding server 14 during the previous clock cycle.

According to an embodiment, each request logic block 134 is configured to assert a corresponding one of the arbiter request signals 22 during a particular clock cycle if the corresponding client select logic block 132 has selected a new one of the plurality of clients 12 for access to the corresponding server 14 during the particular clock cycle. For example, as shown in FIG. 4, each client select logic block 132 provides a corresponding one of a plurality of client select indication signals 136 to the corresponding request logic block 134 to indicate whether a new client 12 has been selected. In at least some embodiments, each request logic block 134 is also or alternatively configured to assert the corresponding arbiter request signal 22 during a particular clock cycle if the corresponding client select logic block 132 has not selected a new one of the plurality of clients 12 for the particular clock cycle, but the corresponding server acknowledge signal 24 was de-asserted during a clock cycle prior to the particular clock cycle. Stated another way, each request logic block 134 is also or alternatively configured to assert the corresponding arbiter request signal 22 during a particular clock cycle when a client 12 selected during a clock cycle prior to the particular clock cycle was not acknowledged by the corresponding server 14 in the prior clock cycle, in at least some embodiments.

Figure 5A:
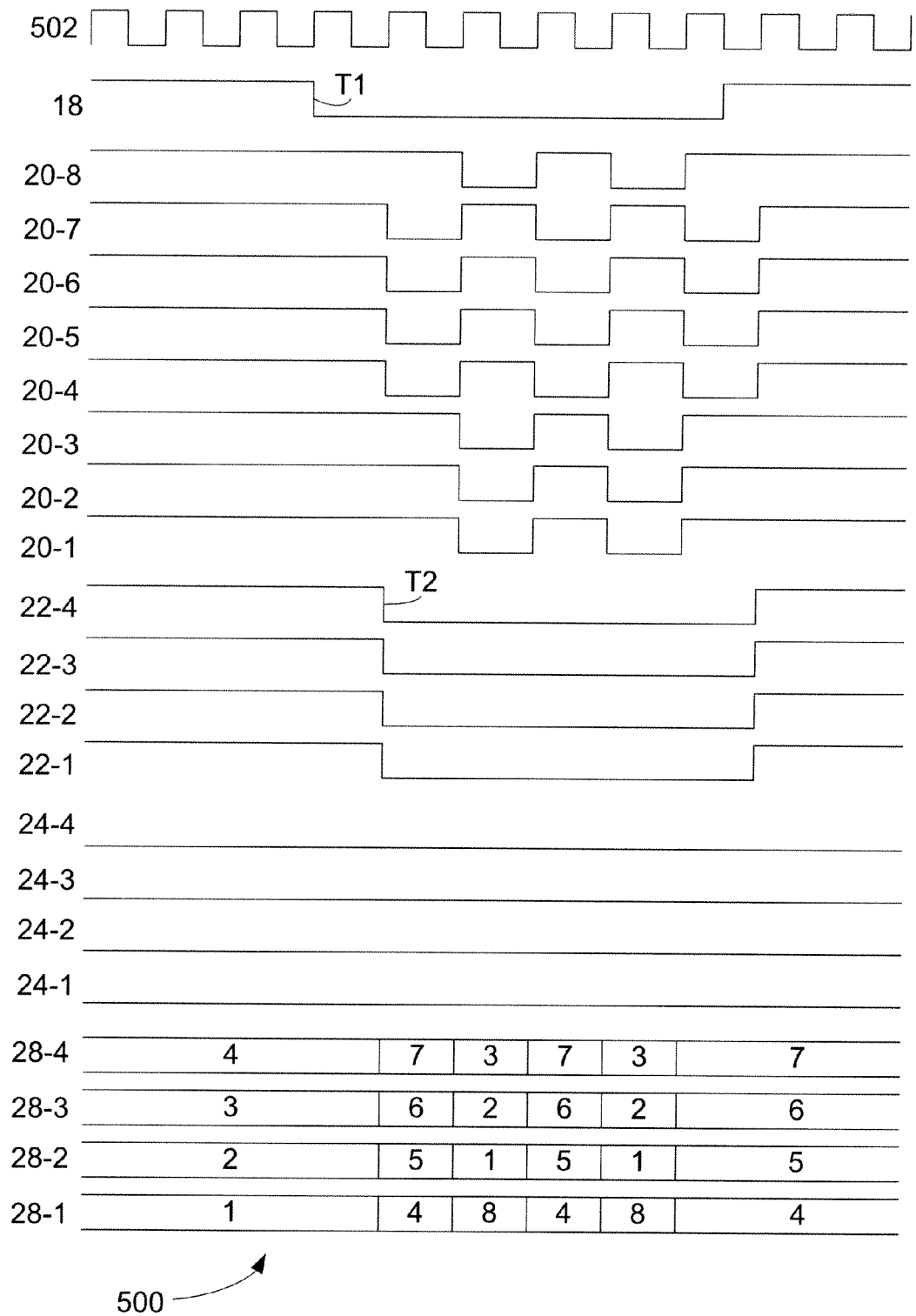
FIGS. 5A and 5B are example timing diagrams showing the states of various signals in a system for managing server access of a plurality of clients, according to an embodiment.
Figure 5B:
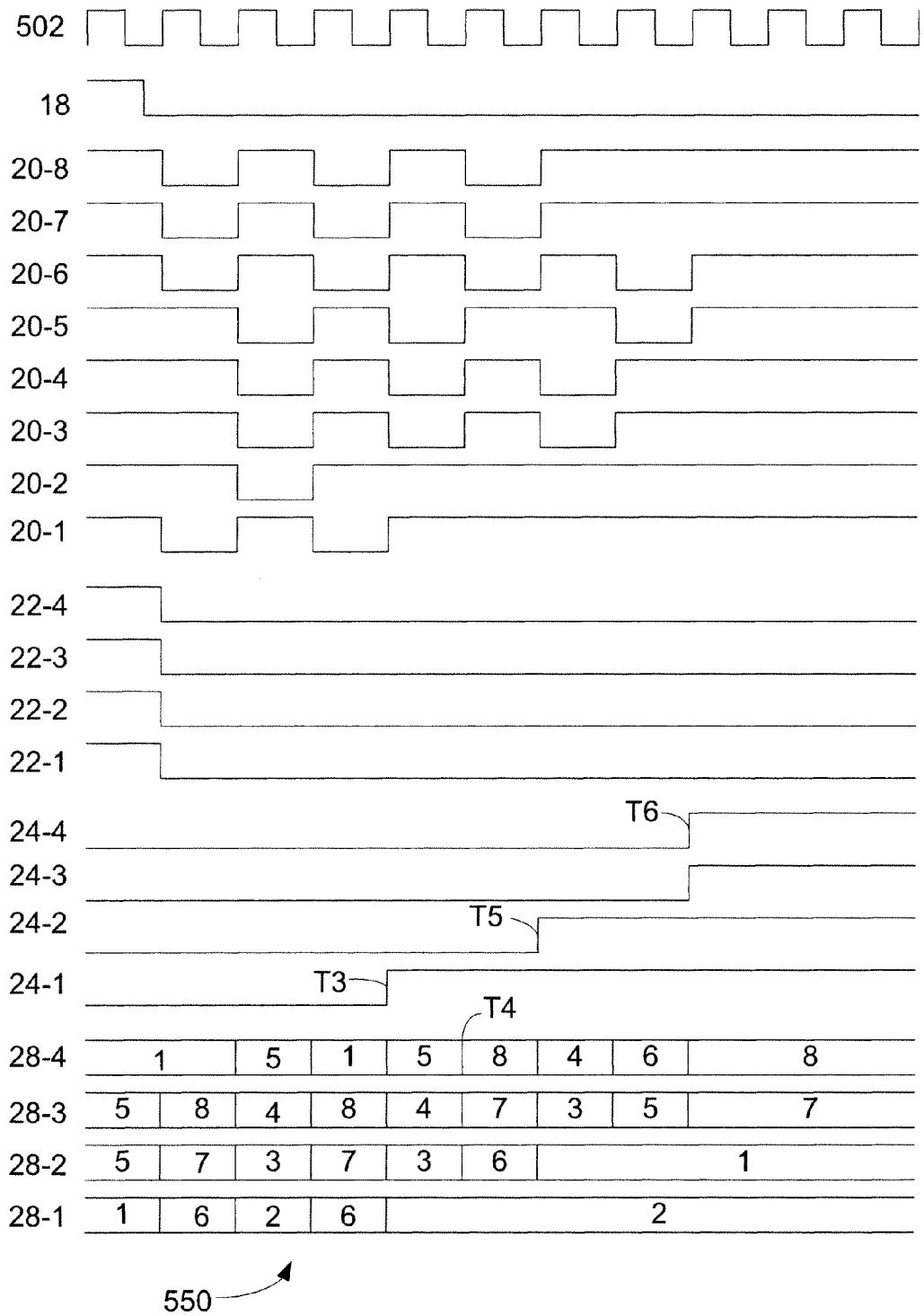

FIGS. 5A and 5B are example timing diagrams 500 and 550 showing the states of various signals in a system for managing server access of a plurality of clients, according to an embodiment. The example timing diagrams 500 and 550 and the signals illustrated therein will be described with reference to the example system 10 (FIG. 1A and FIG. 1B) for ease of explanation and illustration. However, it is noted, in light of the teachings and disclosure herein, that the system features illustrated by the example timing diagrams 500 and 550 are, in various other embodiments, features of systems other than the system 10. Similarly, in various embodiments, the system 10 operates in a manner that generates signals and/or signal states different from those shown in the example timing diagrams 500 and 550.

With particular reference to FIG. 5A, the timing diagram 500 shows the states of signals in the system 10 when none of the plurality of servers 14 takes more than one clock cycle to acknowledge any requests from the plurality of clients 12, according to an example. The timing diagram 500 shows a clock signal 502, as well as one of the client request signals 18. In the example of FIG. 5A, each of the plurality of clients 12 asserts or de-asserts its corresponding client request signal 18 at the same time(s) as each other one of the clients 12. For example, when the client 12-1 asserts the client request signal 18-1, each of the clients 12-2 through 12-8 asserts its corresponding one of the client request signals 18-2 through 18-8. Accordingly, for ease of illustration, FIG. 5A shows a single one of the client request signals 18 to represent the states of all of the client request signals 18.

The timing diagram 500 also shows a plurality of arbiter acknowledge signals, such as the plurality of arbiter acknowledge signals 20 of FIG. 1A, which in some embodiments are asserted by one or more of the client select logic blocks 132 upon selection of a corresponding one or more new clients 12 and acknowledgement of the corresponding one or more new clients 12 by a corresponding one or more of the servers 14 (e.g., as indicated by a corresponding one or more of the server acknowledge signals 24). The arbiter acknowledge signals 20 are then, according to various embodiments, transmitted to the one or more newly selected clients 12. The example timing diagram 500 further shows the plurality of arbiter request signals 22, each of which is generated by the arbiter 16 as described above and provided to a corresponding one of the servers 14, in an embodiment. The plurality of server acknowledge signals 24 from the servers 14 to the arbiter 16 are also illustrated in the timing diagram 500. The timing diagram 500 further illustrates the plurality of client select signals 28, which in some embodiments are generated by the plurality of client select logic blocks 132 to indicate the subset of the plurality of clients 12 selected by the plurality of client logic blocks 132 for access to the plurality of servers 14 during a particular clock cycle.

With reference to the example timing diagram 500, each of the plurality of clients 12 asserts its client request signal 18 to the arbiter 16 as shown. In particular, FIG. 5A shows that the client request signals 18 are asserted at a time T1. As will be understood in light of the teaching and disclosure herein, the timing diagram 500 shows "active low" signals in a system; that is, signals that are asserted when such signals have a logic low (e.g., "0") value, and de-asserted when such signals have a logic high (e.g., "1") value. Of course, in other suitable embodiments, any suitable combination of "active low" and "active high" (e.g., assertion corresponds to a logic high value, and de-assertion corresponds to a logic low value) signals, or all active low or all active high signals, is used.

With continued reference to the timing diagram 500, each cycle of the clock signal 502 (or "clock cycle") is defined as, for example, the period between one rising edge of the clock signal 502 and the next rising edge of the clock signal 502. In another embodiment, the clock cycle is defined as a period between falling edges of the clock signal 502. FIG. 5A shows the arbiter request signals 22 being asserted at a time 12 corresponding to a first rising edge of the clock signal 502 that occurs after the time T1. In other words, the arbiter request signals 22 are asserted during the first clock cycle following that in which the client request signals 18 are asserted, in some embodiments. According to an embodiment, and as described above, the arbiter request signals 22 are asserted in response to the corresponding client select logic blocks 132 selecting new ones of the plurality of clients 12 for access to the plurality of servers 14 during the first clock cycle following that in which the client request signals are asserted. For example, as shown in the timing diagram 500, at the time T2, the client select signals 28-1 through 28-4 indicate that the clients 12-4, 12-5, 12-6, and 12-7 are selected for access to the plurality of servers 14 so that the plurality of servers 14 can provide particular requested services to the clients 12-4, 12-5, 12-6, and 12-7 (e.g., as represented by the corresponding data signals 26-4, 26-5, 26-6, and 26-7). In response to the selection of the clients 12-4, 12-5, 12-6, and 12-7, the request logic blocks 134-1 through 134-4, respectively, assert the arbiter request signals 22-1 through 22-4, respectively, in an embodiment.

Additionally, the example timing diagram 500 shows that during the clock cycle in which the client select logic blocks 132-1 through 132-4 select the clients 12-4, 12-5, 12-6, and 12-7, respectively, the server acknowledge signals 24-1 through 24-4 are asserted. As a result, the arbiter acknowledge signals 20-4, 20-5, 20-6, and 20-7, respectively, are asserted to the clients 12-4, 12-5, 12-6, and 12-7, respectively. Accordingly, the clients 12-4, 12-5, 12-6, and 12-7 will know that they have been acknowledged by the servers 14-1 through 14-4 during the clock cycle beginning at the time 12, in some embodiments.

The timing diagram 500 shows the states of signals in the system 10 during subsequent clock cycles as well. Additionally, as noted above, FIG. 5A shows the states of signals in the system 10 when none of the plurality of servers 14 takes more than one clock cycle to acknowledge any requests from the plurality of clients 12. Consequently, the server acknowledge signals 24-1 through 24-4 are continuously asserted throughout the selection of different clients 12, and when the client request signals 18 are asserted, new clients 12 are selected by each of the client select logic blocks 132 every clock cycle, as shown by, for example, the changing of the client select signals 28-1 through 28-4 at the beginning of every such clock cycle.

On the other hand, the example timing diagram 550 of FIG. 5B shows the states of signals in a system, such as the system 10, during periods of operation that include times when one or more of the servers 14 take more than one clock cycle to acknowledge requests from one or more of the plurality of clients 12. According to an example, FIG. 5B shows that at a time T3 corresponding to a rising edge of the clock signal 502, the server acknowledge signal 24-1 is de-asserted because, for example, the server 14-1 (e.g., a memory, as further described below) is unable to process data sent from the client 12-2 (e.g., a packet processing unit of an ingress pipeline within a packet processing core, as further described below) to the server 14-1 in conjunction with an assertion of a client request signal from the client 12-2 (e.g., an assertion of the client request signal 18-2, as generally indicated in FIG. 5B by the assertion of the client request signals 18). Thus, the server 14-1 does not acknowledge the client 12-2 during the clock cycle beginning at the time 13. According to various embodiments, and as described above, the client select logic block 132-1 corresponding to the server 14-1 continues to select the client 12-2 for access to the server 14-1 during subsequent clock cycles because the request from the client 12-2 has not been acknowledged by the server 14-1. Accordingly, FIG. 5B shows the client select signal 28-1 continuing to indicate that the client 12-2 is selected for access to the server 14-1 during such subsequent clock cycles.

Consequently, according to an example where the round robin selection sequence corresponds to the numerical order of the clients and repeats, for example, indefinitely (e.g., 12-1, 12-2, . . . , 12-8, 12-1, etc.), the example timing diagram 550 shows that during a first such subsequent clock cycle beginning at a time 14, the client select logic blocks 132-2 through 132-4, respectively, select the clients 12-6, 12-7, and 12-8 for access to the servers 14-2 through 14-4, respectively. The example timing diagram 550 further shows that during the clock cycle beginning at the time 14, the client select logic block 132-1 continues to select the client 12-2 for access to the server 14-1, as discussed above.

In an example, one or more of the servers 14-2 through 14-4 also becomes unable to process a corresponding one or more client requests. Thus, the example timing diagram 550 further shows that during a second subsequent clock cycle beginning at a time 15, the server acknowledge signal 24-2 corresponding to the server 14-2 is de-asserted. According to an embodiment, the client select logic blocks 132-3 and 132-4 then continue to select clients for access to the servers 14-3 and 14-4, as indicated by the client select signals 28-3 and 28-4 in FIG. 5B, in a manner analogous to that described with respect to the case where only the server acknowledge signal 24-1 is de-asserted. In the example of FIG. 5B, the server acknowledge signals 24-3 and 24-4 are also de-asserted at a time T6, and thus none of the client select logic blocks 132 select new clients 12 for access to the servers 14 for at least a suitable period of time thereafter in order to allow the waiting clients 12-1, 12-2, 12-7, and 12-8 to be acknowledged.

In an embodiment, the plurality of clients 12 comprises a plurality of processing units of one or more packet processing pipelines. For example, the one or more packet processing pipelines include one or more of an ingress packet processing pipeline and an egress packet processing pipeline implemented in a network switching device such as an Ethernet switch, in an embodiment. The network switching device is, for example, a network switching device as disclosed in U.S. patent application Ser. No. 12/706,704, entitled "SWITCH DEVICE HAVING A PLURALITY OF PROCESSING CORES," filed on Feb. 16, 2010, which is referred to above and the entire disclosure of which has been incorporated by reference herein.

Figure 6:
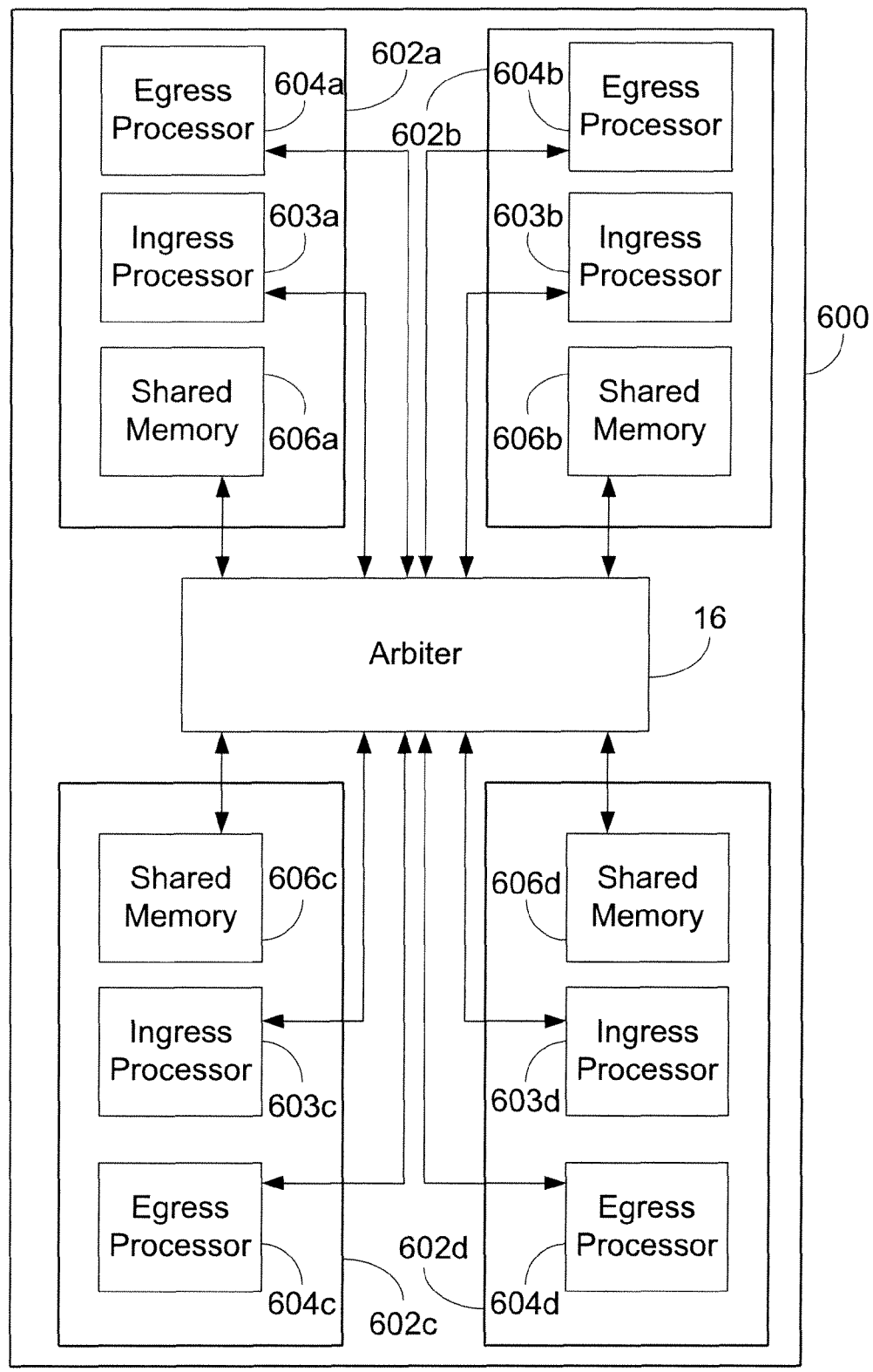
FIG. 6 is a block diagram of an example integrated circuit that may be used in a switch device such as an Ethernet switch, according to another embodiment.

FIG. 6 is a block diagram of an example integrated circuit (IC) 600 that may be used in a switch device such as an Ethernet switch, according to an embodiment. The example IC 600 includes the arbiter 16 and a plurality of packet processing cores 602a-602d. Each packet processing core 602 includes a corresponding ingress packet processor 603, a corresponding egress packet processor 604, and a corresponding memory 606 that is shared amongst all the packet processing cores 602a-602d. Of course, the example IC 600 includes more than four packet processing cores 602 or less than four packet processing cores 602 according to various other embodiments. In an embodiment, the plurality of servers 14 described above comprises the plurality of shared memories 606, and the arbiter 16 thus manages shared access of the plurality of packet processing units to the plurality of shared memories 606. Thus, the plurality of clients 12 described above comprises the plurality of packet processing units of pipelines in the IC 600, in an embodiment. In some embodiments, the shared memories 606a-606d are not implemented as parts of the packet processing cores 602a-602d. In some embodiments, the shared memories 606 include more than four or less than four shared memories, as needed or desired. The shared memories 606 are, in various embodiments, a plurality of resources to which the processing units of ingress and/or egress pipelines of the ingress processors 603 and/or the egress processors 604 have shared access.

In one example, the plurality of shared memories 606 comprises a plurality of ternary content addressable memories (TCAMs) to store one or more of forwarding database (FDB) data, next hop data, policy control list (PCL) data, VLAN data, multicast group data, etc. In some embodiments, the IC 600 includes one or more counters (not shown) for use in policy control, such as for use in performing traffic measurements and rate limiting with respect to particular computing devices which utilize the network switch for communication over a network. Thus, in an embodiment, the plurality of servers 14 described above comprises the one or more counters, and the arbiter 16 thus manages shared access of the plurality of processing units to the one or more counters.

According to another embodiment, the plurality of clients 12 comprises the packet processing cores 602a-602d themselves. According to an embodiment, the plurality of servers 14 comprises a plurality of resources to which the plurality of packet processing cores 602a-602d have shared access. In some examples, the plurality of clients 12 more particularly comprises a plurality of packet processing pipelines of the plurality of packet processing cores 602a-602d, such as a plurality of ingress packet processing pipelines of the plurality of ingress processors 603 or a plurality of egress packet processing pipelines of the plurality of egress processors 604. In one example, the plurality of servers 14 comprises a plurality of memories such as, for example, the plurality of shared memories 606a-606d shown in FIG. 6 and described above. According to various embodiments, the packet processing cores 602a-602d (e.g., the ingress and egress pipelines therein) disposed on the IC 600 share the plurality of memories 606a-606d in order to efficiently store and/or retrieve data that needs to be accessible by all the packet processing cores 602a-602d, and/or data that is otherwise necessary or desirable to store in one or more common memories. In some embodiments, at least a portion of one or more of forwarding database (FDB) data, next hop data, etc. from each of the plurality of packet processing cores 602a-602d needs to be accessible by all of the packet processing cores 602a-602d, and is therefore stored in the plurality of shared memories 606a-606d. Additionally, it is noted that, in at least some cases, allowing the packet processing cores 602a-602d to share the memories 606 under the control of the arbiter 16 reduces the size and expense of the IC 600.

In still another embodiment, the plurality of clients 12 comprises or otherwise identifies a plurality of descriptors allocated among a plurality of direct memory access (DMA) units of a network switching device. In one embodiment, each DMA unit is included in a separate packet processing core of the network switching device, such as a separate one of the packet processing cores 602a-602d. According to an example, the network switching device receives a plurality of data frames via a plurality of ports, and writes the received data frames to buffers while descriptors associated with the received data frames are processed. In some embodiments, the plurality of servers 14 comprises a plurality of groups or "pools" of free buffers from which the buffers are allocated.

In any event, in at least some embodiments, each buffer is located in one of a plurality of data memories. In some embodiments, when one or more buffers are allocated for a received data frame, a write DMA unit writes information from the received data frame into the one or more allocated buffers. Accordingly, in embodiments such as those described above, the arbiter 16 manages access of a plurality of DMA units to a plurality of pools or data memories that include free buffers. For example, in one embodiment, a network switching device includes four write DMA units and two data memories that each include a pool of free buffers. Accordingly, the arbiter 16 manages access of the four write DMA units to the two data memories so that buffers in the two data memories are allocated in an efficient and fair manner. In other words, the buffers are allocated in a manner that allows the two data memories to be shared by, for example, four packet processing cores such as the packet processing cores 602a-602d.

While examples are provided above that describe the plurality of clients 12 and the plurality of servers 14 solely in the context of a network switching device for descriptive clarity, it is noted that in various other devices, the plurality of clients 12 comprises for example any suitable components for which shared access to a plurality of resources (e.g., the plurality of servers 14) is required or desired. In some examples, the plurality of clients 12 and/or the plurality of servers 14 are not part of a network switching device. For example, in one embodiment, the plurality of clients 12 comprises a plurality of individual processors or "cores" of a multi-core processor for a personal computer, a smart phone, a gaming system, etc., and the plurality of servers 14 comprises a plurality of caches shared by the plurality of cores. In another example, the plurality of servers 14 comprises a plurality of main system memories and/or segments of one or more main system memories. The plurality of cores and/or the plurality of caches, main memories, and/or memory segments are not part of a network switching device, in some embodiments. The plurality of caches, main memories, and/or memory segments, for example, implement one or more functions such as those described in the examples above, according to various embodiments. In still further embodiments, the plurality of clients 12 comprises other suitable clients such as state machines, logic, etc. In various embodiments, the plurality of servers 14 comprises any suitable shared resources such as, for example, memories, counters, etc.

Moreover, in many of the examples described herein, the arbiter 16 implements shared access of all of the plurality of clients 12 to the plurality of servers 14. However, in other examples, the arbiter 16 implements shared access of less than all of the plurality of clients 12 to the plurality of servers 14 when one or more of the plurality of clients 12 are not requesting access to the plurality of servers 14.

Figure 7:
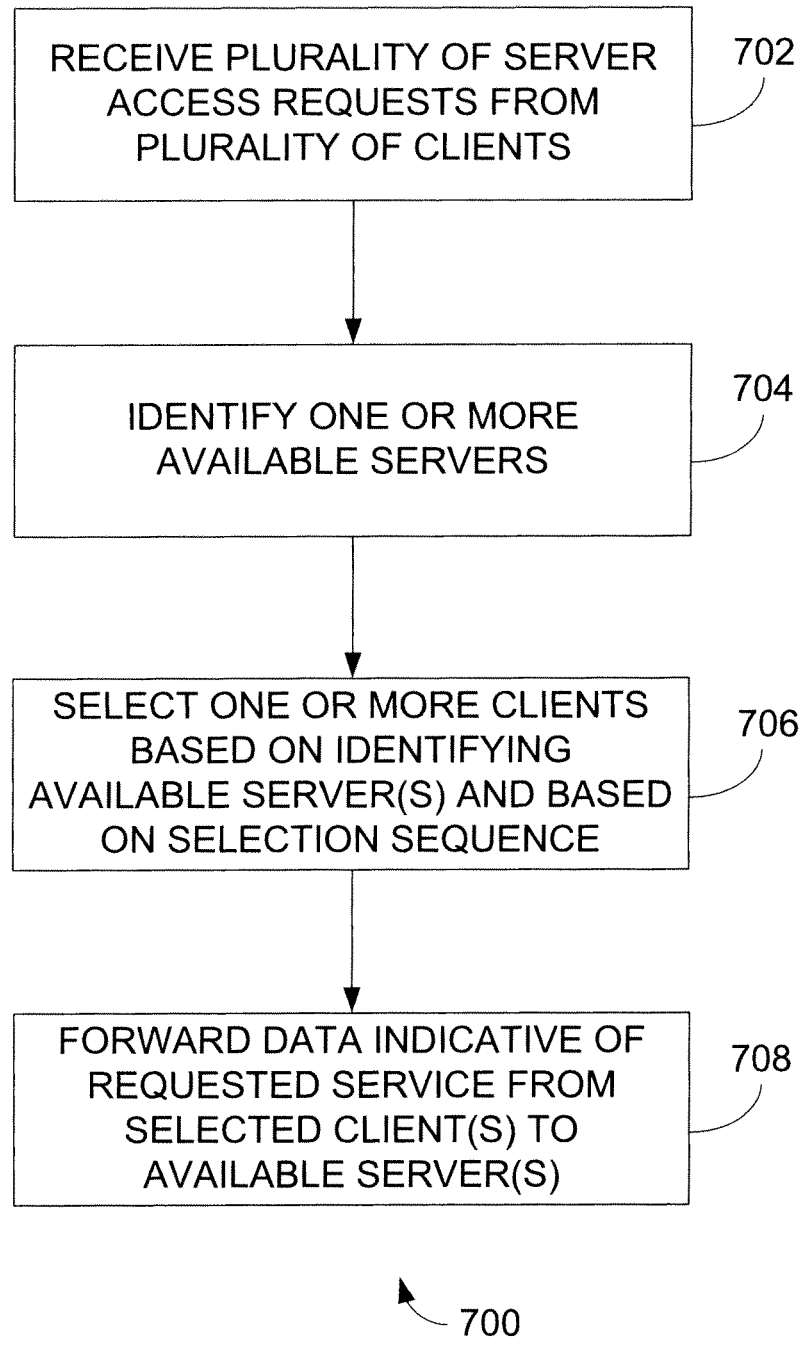
FIG. 7 is a flow chart of an example method for managing server access of a plurality of clients, according to an embodiment.

FIG. 7 is a flow chart of an example method 700 for managing server access of a plurality of clients, such as for managing access of the plurality of clients 12 to the plurality of servers 14, according to an embodiment. For ease of explanation, the method 700 will be described with reference to various embodiments of the example system 10 and, in particular, with reference to various embodiments of the arbiter 16, the plurality of clients 12, and the plurality of servers 14. In some embodiments, however, the method 700 is implemented using systems other than the system 10 and/or the clients 12, servers 14, and arbiter 16 thereof. Additionally, the system 10 and the clients 12, servers 14, and arbiter 16 thereof are configured to perform the method 700, in some embodiments. It is noted that the system 10 and the clients 12, servers 14, and arbiter 16 thereof are configured to perform methods other than the method 700, in some embodiments.

At block 702, a plurality of server access requests are received from a plurality of clients. For example, block 702 includes receiving the plurality of client request signals 18 from the plurality of clients 12, in an embodiment. More particularly, as one example, block 702 includes receiving a plurality of requests from a plurality of packet processing cores of a network switching device to access shared resources (e.g., counters) of the network switching device. According to an embodiment, the plurality of server access requests (e.g., client request signals 18) are received via at least one input port of an arbiter, such as the arbiter 16. Each of the plurality of server access requests is a request for access to any one of the plurality of servers 14, in an embodiment.

At block 704, one or more available servers are identified. For example, block 704 includes identifying one or more of the plurality of servers 14 that are available to respond to the plurality of requests received at block 702. In some embodiments, the plurality of conflict logic blocks 122 and/or the plurality of client select logic blocks 132 identifies the one or more available servers, such as by identifying the one or more available servers based on the states of a plurality of server acknowledge signals as discussed above with respect to, for example, FIGS. 2-4.

At block 706, one or more of the plurality of clients are selected based on identifying the one or more available servers at block 704 and based on a selection sequence. In at least some embodiments, the selection sequence includes each of the plurality of clients from which one of the plurality of server access requests was received at block 702. As discussed with respect to FIGS. 2-4, in some embodiments, the plurality of round robin function blocks 124 is configured to identify one or more clients from which requests were received at block 702 based on the selection sequence, and the plurality of client select logic blocks 132 is configured to select the one or more identified clients for access to the one or more available servers so that the one or more identified clients will be able to receive requested services from the one or more available servers (e.g., as represented by one or more corresponding ones of the data signals 26).

As further discussed above with respect to, for example, FIGS. 2-4, each of the client select logic blocks 132 is configured to maintain a selection of a client that is awaiting a response from a previous clock cycle, according to an embodiment. According to various embodiments, in a given clock cycle, one or more of the plurality of client select logic blocks 132 maintain previous selections of one or more of the plurality of clients for access to a corresponding one or more of the plurality of servers, while one or more additional ones of the plurality of client select logic blocks 132 select new ones of the plurality of clients for access to the plurality of servers. Accordingly, it is noted that blocks 704 and 706 are performed in conjunction, in at least some embodiments. That is, the selection of clients for access to all of the plurality of servers in a particular clock cycle, including the selection of new clients for access to the one or more available servers, includes the identification of the one or more available servers (e.g., resources based on, for example, the server acknowledge signals from each of the plurality of servers.

At block 708, data indicative of a requested service is forwarded from each of the one or more clients selected at block 706 to a corresponding one of the one or more available servers identified at block 704. In one example, one or more of the data signals 26 corresponding to the one or more clients 12 selected at block 706 are forwarded to the one or more available servers 14 through the data MUXes 30 corresponding to the one or more available servers 14, in an embodiment. Each of the one or more data signals 26 represents a requested service, such as a request to write data to memory. In some examples, each of the one or more data signals 26 is then received and processed by one of the one or more available servers 14 so that the one server 14 can provide the requested service indicated by the data signal 26.

One of ordinary skill in the art will recognize suitable variations of the method 700 in light of the teaching and disclosure herein. For example, in some embodiments, one or more blocks or portions of blocks shown in FIG. 7 are not performed, and/or one or more additional blocks not shown in FIG. 7 are performed. In another example, the order shown in FIG. 7 does not indicate the order in which the method 700 must be performed, and/or does not indicate that each block must be completed before another block begins.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    receiving, via at least one input port of an arbiter, a plurality of server access requests from a plurality of clients;
    identifying two or more of a plurality of servers that are available for respective access by multiple ones of the plurality of clients;
    selecting, based on a selection sequence that includes each of the plurality of clients from which the plurality of server access requests has been received, a first client of the plurality of clients for access to a first server of the two or more of the plurality of servers during a particular clock cycle;
    masking, during the particular clock cycle and at an input of a function block used in selecting a second client of the plurality of clients for access to a second server of the two or more of the plurality of servers, a first server access request from the first client that has already been selected for access to the first server during the particular clock cycle;
    selecting, using the function block, the second client for access to the second server based on the selection sequence during the particular clock cycle; and
    forwarding data indicative of a requested service from each of the two or more selected clients to a corresponding one of the two or more available servers.

2. A method according to claim 1, wherein identifying the two or more available servers comprises:
    identifying a first number of servers available for respective access by multiple ones of the plurality of clients during a first clock cycle; and
    identifying a second number of servers available for respective access by multiple ones of the plurality of clients during a second clock cycle;
    wherein selecting the first client of the plurality of clients comprises:
        selecting, during the first clock cycle, a first subset of the plurality of clients based on the selection sequence and based on the first number of servers; and
    wherein selecting the second client of the plurality of clients comprises:
        selecting, during the second clock cycle, a second subset of the plurality of clients based on the selection sequence and based on the second number of servers.

3. A method according to claim 2, wherein selecting the second subset of the plurality of clients during the second clock cycle is further based on selecting the first subset of the plurality of clients during the first clock cycle.

4. A method according to claim 1, wherein the plurality of clients comprises a plurality of processing units of a network switching device; and
    wherein the plurality of servers comprises a plurality of shared resources of the network switching device.

5. A method according to claim 1, wherein the plurality of clients corresponds to a plurality of memory access units of a network switching device;
    wherein the plurality of servers comprises a plurality of buffers of the network switching device; and
    wherein selecting the first client and the second client comprises allocating buffers from the plurality of buffers to a set of the plurality of memory access units.

6. An arbiter, comprising:
    at least one input port configured to receive a plurality of server access requests from a plurality of clients;
    a plurality of selection logic blocks communicatively coupled to the at least one input port, the plurality of selection logic blocks configured to:
        identify two or more of a plurality of servers that are available for respective access by multiple ones of the plurality of clients,
        select two or more of the plurality of clients based on identifying the two or more available servers and based on a selection sequence that includes each of the plurality of clients from which the plurality of server access requests has been received, and
        generate one or more selection signals causing data indicative of a requested service to be forwarded from each of the two or more selected clients to a corresponding one of the two or more available servers;
    a plurality of round robin function blocks communicatively coupled to the plurality of selection logic blocks, the plurality of round robin function blocks configured to identify, during each of a plurality of cycles of a clock signal, a subset of the plurality of clients for selection by the plurality of selection logic blocks; and
    a plurality of conflict logic blocks communicatively coupled to the at least one input port and the plurality of round robin function blocks, the plurality of conflict logic blocks configured to mask, during each of the plurality of cycles of the clock signal, one or more of the plurality of server access requests at an input of at least one of the plurality of round robin function blocks.

7. An arbiter according to claim 6, wherein the plurality of selection logic blocks is further configured to:

identify, for each of the plurality of cycles of the clock signal, a number of the plurality of servers that are available for respective access by multiple ones of the plurality of clients during the cycle of the clock signal, and select, during each of the plurality of cycles of the clock signal, a subset of the plurality of clients based on the selection sequence and based on the number of the plurality of servers that are available during the cycle of the clock signal.

8. An arbiter according to claim 6, wherein the plurality of conflict logic blocks is further configured to mask, during each of the plurality of cycles of the clock signal, at the input of the at least one round robin function block, at least one server access request from at least one client that has already been selected for access to a corresponding at least one of the two or more available servers during the cycle of the clock signal.

9. An arbiter according to claim 8, wherein the plurality of conflict logic blocks is further configured to mask, during each of the plurality of cycles of the clock signal, at the input of the at least one round robin function block, one or more of the plurality of server access requests corresponding to one or more of the plurality of clients that have been selected during a previous cycle of the clock signal when the one or more of the plurality of clients are still awaiting a corresponding one or more responses from a corresponding one or more of the plurality of servers during the cycle of the clock signal.

10. An arbiter according to claim 6, wherein the at least one input port is further configured to receive the plurality of server access requests from a plurality of packet processing cores of a network switching device; and wherein the plurality of selection logic blocks is further configured to:

identify a number of a plurality of shared resources of the network switching device that are available for access by the plurality of packet processing cores, and select a subset of the plurality of packet processing cores based on the selection sequence and based on the number of available shared resources of the network switching device.

11. An arbiter according to claim 6, wherein the at least one input port is further configured to receive the plurality of server access requests from a plurality of packet processing units of a network switching device; and wherein the plurality of selection logic blocks is further configured to:

identify a number of a plurality of shared resources of the network switching device that are available for access by the plurality of packet processing units, and select a subset of the plurality of packet processing units based on the selection sequence and based on the number of available shared resources of the network switching device.

12. A network device configured to selectively transmit packets on a network, the network device comprising:

a plurality of packet processing cores;

a plurality of resources configured for shared access by the plurality of packet processing cores; and an arbiter configured to:

receive a plurality of requests for access to the plurality of resources from the plurality of packet processing cores;

identify two or more of the plurality of resources that are available for respective access by multiple ones of the plurality of packet processing cores;

selecting, based on a selection sequence that includes each of the plurality of packet processing cores from which the plurality of requests has been received, a first packet processing core of the plurality of packet processing cores for access to a first resource of the two or more of the plurality of resources during a particular clock cycle;

masking, during the particular clock cycle and at an input of a function block of the arbiter used in selecting a second packet processing core of the plurality of packet processing cores for access to a second resource of the two or more of the plurality of resources, a first request from the first packet processing core that has already been selected for access to the first resource during the particular clock cycle;

selecting, using the function block, the second packet processing core for access to the second resource based on the selection sequence during the particular clock cycle; and generate one or more selection signals to cause data indicative of a requested service to be forwarded from each of the two or more selected packet processing cores to a corresponding one of the two or more available resources.

13. A network device according to claim 12, wherein each of the plurality of packet processing cores comprises an ingress packet processor and an egress packet processor.

14. A network device according to claim 12, wherein the plurality of resources comprises a plurality of memories.

15. A network device according to claim 14, wherein each of the plurality of packet processing cores comprises one of the plurality of memories.

16. A network device according to claim 12, wherein the plurality of resources comprises a plurality of counters.

17. A method of operating a network device, the network device having a plurality of packet processing cores and a plurality of resources configured for shared access by the plurality of packet processing cores, the method comprising:

receiving a plurality of requests for access to the plurality of resources from the plurality of packet processing cores;

identifying two or more of the plurality of resources that are available for respective access by multiple ones of the plurality of packet processing cores;

selecting, based on a selection sequence that includes each of the plurality of packet processing cores from which the plurality of requests has been received, a first packet processing core of the plurality of packet processing cores for access to a first resource of the two or more of the plurality of resources during a particular clock cycle;

masking, during the particular clock cycle and at an input of at least one function block used in selecting a second packet processing core of the plurality of packet processing cores for access to a second resource of the two or more of the plurality of resources, a first request from the first packet processing core that has already been selected for access to the first resource during the particular clock cycle;

selecting, using the function block, the second packet processing core for access to the second resource based on the selection sequence during the particular clock cycle; and forwarding data indicative of a requested service from each of the two or more selected packet processing cores to a corresponding one of the two or more available resources.

18. A method according to claim 17, wherein each of the plurality of packet processing cores comprises an ingress packet processor and an egress packet processor.

19. A method according to claim 17, wherein the plurality of resources comprises a plurality of memories.

20. A method according to claim 19, wherein each of the plurality of packet processing cores comprises one of the plurality of memories.

21. A method according to claim 17, wherein the plurality of resources comprises a plurality of counters.

* * * * *